United States Patent Office 3,293,166
Patented Dec. 20, 1966

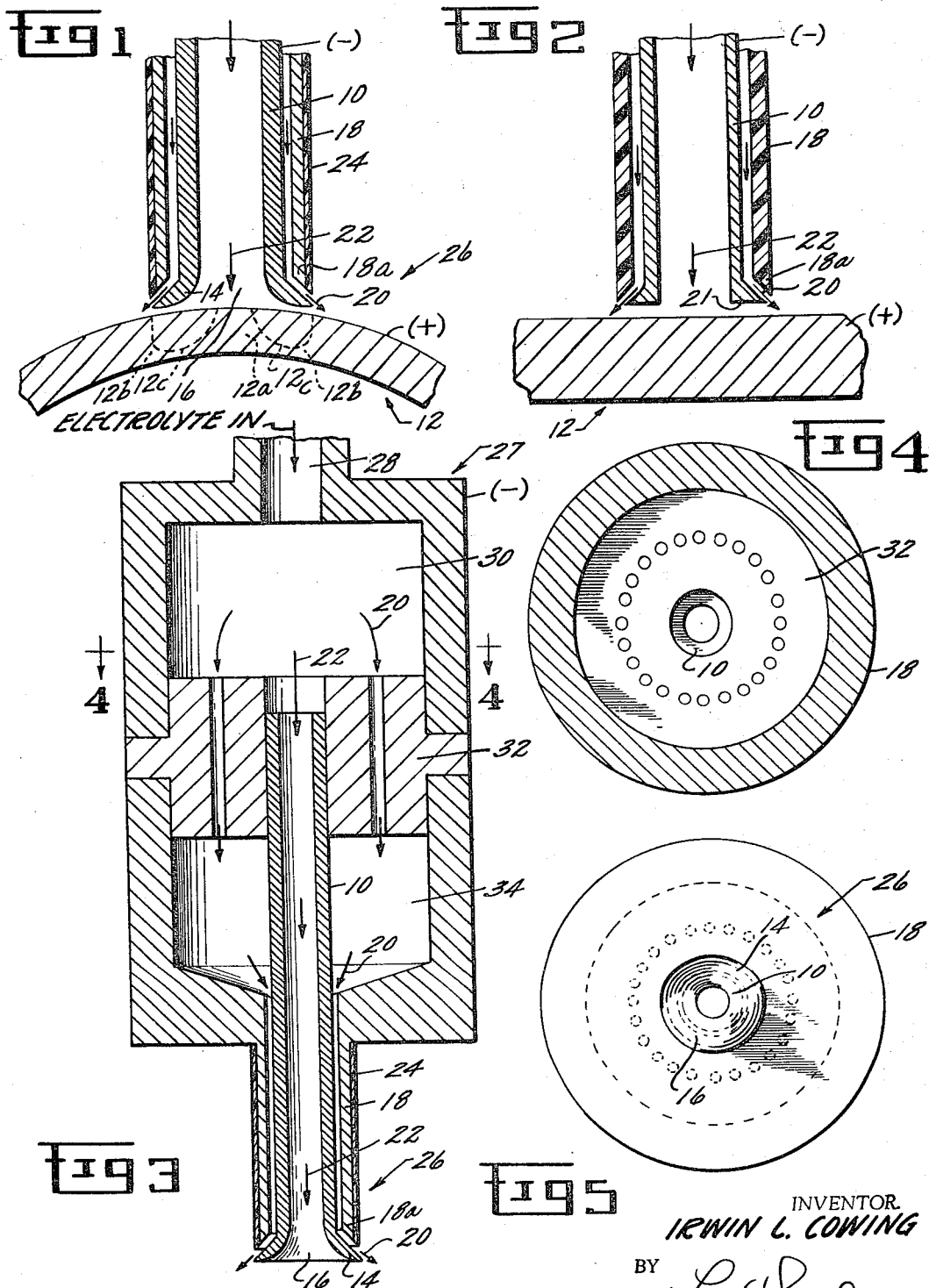

3,293,166
ELECTRODE FOR ELECTROLYTIC MACHINING
Irwin L. Cowing, Cincinnati, Ohio, assignor to General Electric Company, a corporation of New York
Filed May 29, 1963, Ser. No. 284,190
3 Claims. (Cl. 204—224)

This invention relates to electrolytic machining, and more particularly to an electrode and tool for use in electrolytic machining of an opening through a workpiece.

In co-pending application Serial No. 823,975—Crawford et al., filed June 30, 1959, now abandoned, and assigned to the assignee of the present invention, electrolytic material removal apparatus and processes are described. Included in that application is a discussion of the generation of relatively small holes in or through metallic articles. Ordinary simple, hollow electrodes such as are shown in the co-pending application, and through which electrolyte flows to the working area, can be used in the generation through metallic material of relatively small openings, for example about 0.060″ or smaller average diameter. In one form, the electrodes are hollow electrically conductive tubes through which electrolyte can pass.

However, the use of such a simple electrode in the electrolytic generation of a relatively large opening such as a circular hole, a rectangular slot or an irregularly shaped opening, through metallic material can result in electrolyte starvation and electrode shorting once electrolytic action results in breakthrough in the workpiece material. At the time of such breakthrough, the electrode has not completely finished the opening to be made. The electrolyte which had been flooding the entire area between the electrode and the workpiece now rushes through the lower resistance opening and sufficient electrolyte is prevented from passing between the workpiece and the electrode. This results in a short circuit between the electrode and the workpiece terminating electrolytic action.

It is an object of this invention to provide an electrode through which an electrolyte can be passed and which avoids electrolyte starvation and electric short circuiting between the electrode and the workpiece during the electrolytic machining of relatively large openings through metallic materials.

Another object is to provide an electrode for electrolytic machining which distributes electrolyte in a central flow and peripheral flow, one flow being independent of the other.

Still another object is to provide a tool including such an electrode with means to supply electrolyte to the electrode.

These and other objects and advantages will be more readily recognized from the following detailed description which is meant to be exemplary of rather than limitations on the scope of the invention.

In the drawings:
FIGS. 1 and 2 are cross-sectional views of two forms of the present invention;
FIG. 3 is a cross-sectional view of a tool including the electrode of FIG. 1;
FIG. 4 is a cross-sectional view through 4—4 of the tool of FIG. 3; and
FIG. 5 is a bottom view of the tool of FIG. 3.

The electrode of the present invention, in one form, includes a hollow electrically conductive inner member open at the working end to cooperate in electrolytic machining with a workpiece and through which electrolyte can flow. There is an outer member disposed about the periphery of the inner member, in spaced apart relationship with the inner member, to form between the inner member and the outer member a peripheral passage open at the working end and through which the electrolyte can flow. At the open end there is a means to direct electrolyte flowing from the peripheral passage at the working end in a direction which is both toward the workpiece and away from the hollow portion of the inner member.

Although the present invention can be used in the generation of any relatively large opening through a workpiece, it has been found to be particularly useful in the generation of burr-free large openings in thin sheet material, especially when the surface of the sheet is curved.

In the electrolytic generation of a relatively large hole, whatever its shape, through a metallic workpiece, a hollow electrode is preferred because it requires less electrical energy to produce the hole. The use of a hollow electrode results in a slug of metal being electrolytically cut from the workpiece rather than having all of the workpiece material within the periphery of the hole electrolytically removed. However, a cross-section of the slug, shown in phantom as 12b in the workpiece 12 of FIG. 1, shows the slug to have a relatively thick portion 12b at its outer periphery compared with a thin portion 12c of the slug a short distance radially inward from the periphery.

The complete shape of the slug depends on the electrode shape. However, when electrolytic action brings about a breakthrough in the workpiece at the thin area, 12c, at least one peripheral thicker portion 12b remains attached to the workpiece. At breakthrough, the electrolyte rushes through the opening supplying insufficient electrolyte to the peripheral portion 12b to support electrolytic action.

As the electrode continues to be fed toward the workpiece in an attempt to complete the hole to dimension, absence of electrolyte allow an electric short circuit to occur resulting in termination of electrolytic material removal action and probably damaging the electrode and other apparatus.

The present invention eliminates these difficulties in the electrolytic machining of relatively large openings through metallic materials by providing an electrode with a central flow and a peripheral flow of electrolyte from the working end of the electrode. The peripheral flow, which is maintained independent of the central flow, directs the electrolyte both toward the workpiece and away from the central flow to supply electrolyte to those areas from which electrolyte flow would be reduced by the electrode's breakthrough of the workpiece.

A preferred form of the invention in tubular shape is shown as FIG. 1. This same form is shown in FIG. 3 assembled in a complete tool. In the embodiments of FIGS. 1 and 3, hollow inner member 10 is in the form of a hollow metal tube such as of brass. During operation, member 10 is electrically connected as a cathode and workpiece 12 is connected as an anode. Hollow member 10 is machined outwardly at 14 at its working end, shown generally at 16. Located around the periphery of inner member 10 in spaced apart relationship is outer member 18. Portion 18a of outer member 18 cooperates with the portion 14 of inner member 10 to direct the peripheral electrolyte flow, shown by arrow 20, toward the workpiece 12 and away from the hollow portion of the inner member through which is flowing the central electrolyte flow, shown by arrow 22.

During operation, of the present invention when slug 12a, shown in phantom in FIG. 1, first breaks away from workpiece 12 at 12c, the central electrolyte flow 22 is directed through the opening in the workpiece. At the same time, peripheral electrolyte flow 20 continues to supply electrolyte to the outer peripheral portions 12b between the electrode and the workpiece. The peripheral flow avoids termination of electrolytic action and short circuiting between the electrode and the workpiece as the electrode continues to feed through the workpiece to complete a burr-free opening.

Although it is not always essential, the electrode of the present invention can include a dielectric coating 24 on the outer portion of the outer member. Such a coating would be preferred in the event the outer member is electrically conductive, as it would be in FIG. 3, to avoid undesirable side electrolytic action if the conductive outer member 18 carries the same electrical charge as does member 10. However, in the embodiment of FIG. 2, outer member 18 is itself electrically non-conductive and would not require an additional dielectric coating.

In FIG. 2, outer member 18 is beveled in a manner which, in cooperation with foot 21 of inner member 10, affords direction of peripheral electrolyte flow 20 toward the workpiece 12 and away from the central electrolyte flow 22. It will be readily understood that various means can be provided for such directing of a peripheral electrolyte flow to supply sufficient electrolyte to those areas between the electrode and the workpiece, such as 12a in FIG. 1, which normally would be depleted by the sudden breakthrough in the workpiece by electrolytic action in the area of the central electrolyte flow.

The electrode of the present invention, shown generally at 26 in FIG. 3 is assembled in a tool, shown generally at 27, which provides for central electrolyte flow independent of peripheral electrolyte flow. The tool of FIG. 3 includes an electrolyte inlet 28 connected with an upper chamber 30 which distributes electrolyte through the hollow portion of inner member 10 as well as through a center distributor 32 to a lower chamber 34. FIG. 4 shows a cross-sectional view through 4—4 of FIG. 3. The electrolyte fed into lower chamber 34 is then distributed in the peripheral spacing between outer member 18 and inner member 10.

FIG. 5 is a view of the tool of FIG. 3 from the end on which the electrode of the present invention is located.

The electrodes of FIGS. 1 and 3, as an example, was made from brass and had an outside diameter of about one-quarter inch. The electrode assembled as in FIG. 3 was coated with an electrically non-conductive coating 24 of cured epoxy resin. The electrode of the present invention, assembled in the tool of FIG. 3, was used to machine electrolytically a burr-free one-quarter inch diameter hole in a wall portion of a fuel manifold consisting of a tube of AISI type 321 stainless steel. The tube had an outside diameter of about 5/8 inch. During electrolytic operation an aqueous sodium chloride electrolyte having a concentration of about 2 pounds per gallon of sodium chloride was used under a pressure of about 200 pounds per square inch and at a feed rate of about 0.001 inch per second.

The hole generated through the tube was circular in shape and burr-free. Under the same conditions, the use of an ordinary tubular electrode with a dielectric coating and having an outside diameter of about one-quarter inch resulted in short circuiting in the area of 12b of FIG. 1 and termination of the electrolytic action before the complete slug 12a was removed from the workpiece to form a burr-free one-quarter inch diameter hole.

Although the present invention has been described in connection with the specific embodiments and examples, it will be recognized by those skilled in the art the variations and modifications of which the present invention is capable.

What is claimed is:
1. An electrolytic machining apparatus including an electrode comprising:
 a hollow, metallic inner member open at a working end;
 an outer metallic member disposed about the outer periphery of the inner member in spaced apart relationship therewith to form between the inner member and the outer member a peripheral passage open at the working end, the outer member having on its outer periphery a dielectric coating; and
 means at the working end to direct electrolyte flowing from the peripheral passage in a direction outwardly toward the workpiece and away from the inner member.

2. An electrolytic machining apparatus including an electrode comprising:
 a hollow, electrically conductive inner member open at a working end;
 an electrically non-conductive outer member disposed about the outer periphery of the inner member in spaced apart relationship therewith to form between the inner member and the outer member a peripheral passage open at the working end; and
 means at the working end to direct electrolyte flowing from the peripheral passage in a direction outwardly toward the workpiece and away from the inner member.

3. An electrolytic machining apparatus including a tool comprising an electrode including:
 (a) a hollow, electrically conductive inner member open at a working end,
 (b) an outer member having a dielectric outer surface and disposed about the outer periphery of the inner member in spaced apart relationship therewith to form between the inner member and the outer member a peripheral passage open at the working end, and
 (c) means at the working end to direct electrolyte flowing from the peripheral passage in a direction outwardly toward the workpiece and away from the inner member;
  means to supply electrolyte to the hollow electrically conductive inner member; and
  means to supply electrolyte to the peripheral passage between the inner member and the outer member.

References Cited by the Examiner

UNITED STATES PATENTS

| | | | |
|---|---|---|---|
| 405,391 | 6/1889 | Bear | 239—291 |
| 3,086,548 | 4/1963 | Galiger et al. | 137—484.8 |
| 3,219,568 | 11/1965 | Wilkinson | 204—224 |

JOHN H. MACK, *Primary Examiner.*

W. VAN SISE, *Assistant Examiner.*